Reissued June 22, 1937 Re. 20,417

UNITED STATES PATENT OFFICE 20,417

METHOD OF TREATING NATURAL AND ARTIFICIAL YARNS

John Marshall Hood, South Hadley, Mass.

No Drawing. Original No. 2,050,325 dated August 11, 1936, Serial No. 604,647, April 11, 1932. Application for reissue May 4, 1937, Serial No. 140,677

15 Claims. (Cl. 117—2)

This invention relates to improvements in the methods of setting the twist of rayon yarn, whereby it becomes possible to spin the yarn directly onto weaving or shuttle bobbins, without the necessity of rewinding it to other carriers as a result of the yarn becoming soft or loose on the bobbins, due to a twist-setting operation, thereby eliminating time, expensive machinery and a high labor cost. Yarns having the twist set by my methods will not have to be kept in a conditioning atmosphere. It also applies to the setting of the twist of rayon yarn spun onto intermediate bobbins, or carriers, from which it must later be rewound onto weaving or shuttle bobbins, or to other carriers; such rewinding not being necessary because of faulty twist-setting, but simply to get the yarn onto a more convenient carrier. It also applies to the setting of the twist of cotton, wool, real silk, cellulose acetate, and other natural or artificial fibres spun directly onto weaving or shuttle bobbins, or onto intermediate bobbins for a later rewind onto suitable carriers; it also applies to the preparation of the yarn with the materials used previous to spinnig and then spinning directly onto weaving or shuttle bobbins, or onto intermediate bobbins, the yarn, after spinning requiring no after-treatment to set the twist, when properly prepared, before spinning. Yarn properly treated by my process will be firmly and tightly wound on the bobbin, or other carrier to which it has been twisted and will not require a rewind because it is not firm or tight. Moreover, said yarn will not soften, or become loose during the storage. Any rewinding required will be for the purpose of transferring the yarn to a more convenient form of carrier and not because of the yarn becoming loose, as the result of the twist-setting. Another feature of my improvement is that the twist-setting materials can be recovered and re-used.

The usual method in spinning rayon yarn, at the present time, consists in preparing it for spinning by employing a preliminary treatment, as sizing, waxing, oiling, or other treatment, then passing it through the spinning process and winding it onto bobbins, not weaving or shuttle bobbins. The yarn on the bobbin is now too lively, due to tendency to kink, to be handled and the twist must be set before the yarn can be further processed. This is accomplished in several ways; by means of water or water solutions of gums, starches, dextrines, oils, waxes, by steaming, or by a combination of materials. The treated yarn is then dried, if need be, and then wound onto weaving or shuttle bobbins. This may necessitate winding from the spinning room bobbins to spools on spooling machines, and then winding from spools to the weaving or shuttle bobbins on expensive winding machines. The cost of twist-setting and rewinding is high and my process is designed to eliminate much of the expense.

When rayon yarn is spun directly from a spinning frame onto weaving or shuttle bobbins and the twist set by the methods in use at the present time, such as immersing the yarn in water, or in water solutions of gums, oils, waxes, starches, dextrines, etc., or steamed, the yarn, especially in storage, may swell and soften so that in some cases the bobbin can be pulled away from the yarn. Such bobbins cannot be used for weaving. Claims are made that the yarn does not swell, but that the bobbin dries out. I claim, for my improved process, that it will remedy the trouble, whatever the cause. If due to the bobbin drying, my treatment will overcome the difficulty for, if a properly conditioned bobbin is used at the start, it becomes coated with a protecting layer of wax, oil, or rosin, or other binder, and would neither dry out nor swell appreciably. Moreover, my treatment need not appreciably alter the natural moisture content of any yarn to which it may be applied, and therefore, the tendency to swell in storage, due to water take-up, would be minimized. If the fabric to be treated is a crepe consisting of a highly twisted filling (for instance 50–55 turns per inch per 100 denier 40 filament rayon), and the warp ordinary untwisted rayon, and the warp is sized with a mixture similar to that used in setting the twist, the use of expensive humidifying apparatus in weave rooms can be eliminated, and the bobbins and yarn will not be exposed to changes in atmospheric conditions to produce swelling or drying out. My improvement, therefore, consists in employing a binder for the yarn which does not cause it to swell, or soften, and does not permit the bobbin to dry out or shrink, or become damp with humidity changes.

The main object of my process is to spin directly onto weaving or shuttle bobbins, but protection is also claimed for twist-setting with the same solutions, if intermediate bobbins are used; the yarn being rewound onto the shuttle bobbins, unless wanted for warp yarn, when it would be made into warp. The twist may be set in two different ways, according to one's choice:—

*a*. Spin the yarn onto weaving or shuttle bobbins, or other carriers and set the twist after the spinning operation, by means of chemicals to be hereinafter mentioned.

*b.* Prepare the yarn with chemicals to be hereinafter mentioned. Next, spin the yarn onto weaving bobbins, which are then ready for weaving, without after-treatment. The yarn may also be spun to other carriers, without an after-treatment to set the twist. Under certain conditions, one might want to allow the bobbins to stand for a time, before weaving, or place them into a drying oven for a few minutes at a temperature approaching the melting point of the material, or materials used for twist-setting. In case yarn is to be heated, it is advisable not to use it until cool and the chemicals used have had time to set.

The chemicals, which I use to set the twist, I call "binders" and are waxes, as for example, Japan wax, bees wax, carnauba wax, oils, rosin, resins, stearic acid, or any other similar substances or mixtures of substances capable of setting the twist.

By the term oils is meant the common oils used in textile processing that are well known to textile technologists. These include:—

1. Animal oils, for example, lard, neat's-foot, red oil (oleic acid), tallow.

2. Vegetable oils, for example, olive, cottonseed, castor, rape-seed, peanut.

3. Mineral oils of the grades sold for textile finishing operations.

For the most economical working of the improvement, the materials used for twist-setting should be recovered from the woven cloth for re-use and, therefore, should be soluble in a non-aqueous solvent, although water may be present, such as carbon tetrachloride ($CCl_4$), trichlorethylene ($C_2HCl_3$), alcohol, gasoline, solvent naphtha, xylene, or any other suitable similar solvent now known.

The binders may be applied in one of several ways to the yarn.

*First.*—They may be raised to their melting point and applied to the yarn, after spinning. Thus, using Japan wax, as a binder, it is melted and a small amount applied to the outside of each wound bobbin, either by spraying or brushing. The bobbins are then placed in a chamber heated to the melting point of the wax and the wax allowed to penetrate the yarn. The bobbins, after cooling, are ready for use. Another way is to place the wound bobbins in a warm (melted) binder and centrifuge out the excess in a centrifuge heated to the melting point of the binder.

*Second.*—The rayon skeins can be impregnated with the binder for instance, by means of a heated centrifuge, so that the yarn, after spinning to weaving, or shuttle bobbins, will have the twist set without after-treatment. Impregnating the yarn in skein form would be of interest to the rayon manufacturers, as they could sell their rayon, ready for twisting directly to weaving or shuttle bobbins and in addition, by proper treatment, the same yarn could be used for warp yarn without additional sizing. After weaving the cloth, the binders could, for economical working, be recovered for re-use by means of volatile solvents.

*Third.*—The yarn could also be impregnated with hot wax on perforated packages, or individual threads could be sized with hot binders by drawing through the melted binder.

The binders can be dissolved in volatile solvents, such as are listed above. The yarn is then impregnated with the solution, the excess liquor removed and the yarn dried by evaporation of the solvent, the solvent being recovered for re-use by condensation. Yarn may be prepared, before spinning, with the binder solvent solution and the twisted yarn taken from the spinning frame with the twist set, or the yarn before treatment with the solutions can be spun and the twist set after spinning by treatment with the solutions.

*Fourth.*—Rayon yarn could be treated in the skein form, so that it could be used for twisting and also for warping, without extra sizing.

*Fifth.*—The yarn may be treated on perforated packages, or ordinary packages. As stated, for economical operation, the binders and solvents should be recovered.

For the most economical operation, the binders used should be recovered from the woven cloth by means of solvent extraction and used over again. The solvents used are also recovered and re-used.

Formulas which may be employed for twist-setting after spinning are as follows:

For 100 denier—40 filament rayon spun 50–55 turns to the inch:—

| | | |
|---|---|---|
| Rosin | grams | 100 |
| Water | cubic centimeters | 300 |
| 95% alcohol | do | 700 |
| or | | |
| Rosin | grams | 100 |
| Japan wax | do | 100 |
| Carbon tetrachloride | cubic centimeters | 300 |
| or | | |
| Rosin | grams | 113 |
| Japan wax | do | 56 |
| Carbon tetrachloride | cubic centimeters | 700 |

Brush the outside of the wound bobbins with Japan wax heated just above the melting point, then keep bobbins in a warm place, heated to the melting point. Cool and weave. The following admixture may be used.

| | | |
|---|---|---|
| Japan wax | grams | 300 |
| Carbon tetrachloride | cubic centimeters | 300 |

This mixture can be used for impregnating skeins preceding the spinning operations, and the bobbins can then be taken from the spinning frame with the twist set.

The above formulas illustrate mixtures that are workable. I do not bind myself to use of the above formulas only.

In the case of cellulose acetate yarns, a solvent must be used that is non-injurious to the cellulose acetate.

By variation in the quantity of the different ingredients used, as binder mixtures, differences in stiffness, elasticity, and stickiness can be imparted to the yarn depending upon the effects one desires to obtain. If the woven cloth is properly extracted with solvent, the binders should all be removed. However, if traces were not removed, they would be scoured out in the finishing process. The use of Japan wax and rosin is recommended.

I also claim protection for the use of solvent binder, mixtures, described above, if the rayon is first passed through the solution and then spun (so-called wet spinning process), with or without an after-treatment.

What I claim is:—

1. In a method of setting the twist of rayon, wool, real silk, cellulose acetate, and cotton yarns and the recovery for re-use by means of volatile solvents of the materials used in setting the twist as well as the recovery of the volatile solvents for the steps comprising twisting the yarns onto a suitable carrier, then setting the twist with a mixture of oils, waxes and rosin, and recovering from the woven fabric, the oils, waxes and rosin by extraction with volatile solvents and separating said solvent from the twist-setting medium by distillation.

2. In a method of setting the twist of rayon, wool, real silk, cellulose acetate, and cotton yarns, and the recovery for re-use by means of volatile solvents of the materials used in setting the twist as well as the recovery of the volatile solvents comprising, pre-treating the yarn with a mixture of oils, waxes, and rosin, then twisting the yarn onto suitable carriers, and recovering from the woven fabric the oils, waxes and rosin by extraction with volatile solvents and separating said solvents from the twist-setting medium by distillation.

3. In a method of setting the twist of rayon, wool, real silk, cellulose acetate, and cotton yarns and the recovery for re-use by means of volatile solvents of the materials used in setting the twist as well as the recovery of the volatile solvents, the steps comprising twisting the yarns onto a suitable carrier, then setting the twist with a mixture of oils, waxes, and rosin, constructing a fabric and extracting from said fabric, the oils, waxes and rosin by extraction with volatile solvents.

4. In a method of setting the twist of rayon, wool, real silk, cellulose acetate, and cotton yarns, and the recovery for re-use by means of volatile solvents of the materials used in setting the twist as well as the recovery of the volatile solvents comprising, pre-treating the yarn with a mixture of oils, waxes, rosin, then twisting the yarn onto suitable carriers, constructing a fabric and extracting from said fabric the oils, waxes and rosin by extraction with volatile solvents.

5. In a method of setting the twist of natural and artificial fibre yarns and the recovery for re-use by means of volatile solvents of the materials used in setting the twist as well as the recovery of the volatile solvents, the steps comprising twisting the yarns onto a suitable carrier, then setting the twist with a twist setting medium soluble in volatile solvents, constructing a fabric and extracting said twist setting medium from the fabric by extraction with volatile solvents.

6. In a method of setting the twist of natural and artificial fibre yarns and the recovery for re-use by means of volatile solvents of the materials used in setting the twist as well as the recovery of the volatile solvents, the steps comprising twisting the yarns onto a suitable carrier, then setting the twist with a twist setting medium soluble in volatile solvents, constructing a fabric and extracting said twist setting medium from the fabric by extraction with volatile solvents and separating said solvents from the twist setting medium by distillation.

7. In a method of setting the twist of natural and artificial fibre yarns, and the recovery for re-use by means of volatile solvents of the materials used in setting the twist as well as the recovery of the volatile solvents comprising pre-treating the yarn with a twist setting medium soluble in volatile solvents, then twisting the yarn onto suitable carriers, constructing a fabric and extracting said twist setting medium from the fabric by extraction with volatile solvents.

8. In a method of setting the twist of natural and artificial fibre yarns, and the recovery for re-use by means of volatile solvents of the materials used in setting the twist as well as the recovery of the volatile solvents comprising pre-treating the yarn with a twist setting medium soluble in volatile solvents, then twisting the yarn onto suitable carriers, constructing a fabric and extracting said twist setting medium from the fabric by extraction with volatile solvents and separating said solvents from the twist setting medium by distillation.

9. In a method of manufacturing textile fabric the steps which comprise treating yarn with a binder that is soluble in a volatile solvent, constructing a fabric containing said treated yarn, extracting said binder from the fabric by extraction with a volatile solvent of said binder, and separating the binder from the solvent.

10. In a method of manufacturing textile fabric, the steps which comprise treating yarn with a binder that is soluble in a volatile solvent, constructing a fabric containing said treated yarn, extracting said binder from the fabric by extraction with a volatile solvent of said binder and distilling the extract to recover both binder and solvent for re-use.

11. In a method of manufacturing textile fabric, the steps which comprise treating yarn with a water insoluble binder that is soluble in a volatile solvent, constructing a fabric containing said treated yarn, and extracting said binder from the fabric by extraction with a volatile solvent.

12. In a method of manufacturing textile fabric, the steps which comprise treating yarn with a water insoluble binder that is soluble in a volatile solvent, constructing a fabric containing said treated yarn, extracting said binder from the fabric by extraction with a volatile solvent of said binder, and separating the binder from the solvent.

13. In a method of manufacturing textile fabric, the steps which comprise treating yarn with a water insoluble binder that is soluble in a volatile solvent, constructing a fabric containing said treated yarn, extracting said binder from the fabric by extraction with a volatile solvent of said binder and distilling the extract to recover both binder and solvent for re-use.

14. In a method of setting the twist of natural and artificial fibre yarns and the recovery for re-use by means of volatile solvents of the materials used in setting the twist as well as the recovery of the volatile solvents, the steps comprising twisting the yarns onto a suitable carrier, then setting the twist with a twist setting medium soluble in volatile solvents, constructing a fabric and extracting said twist setting medium from the fabric by extraction with volatile solvents and separating the binder from the solvent.

15. In a method of setting the twist of natural and artificial fibre yarns, and the recovery for re-use by means of volatile solvents of the materials used in setting the twist as well as the recovery of the volatile solvents comprising pre-treating the yarn with a twist setting medium soluble in volatile solvents, then twisting the yarn onto suitable carriers, constructing a fabric and extracting said twist setting medium from the fabric by extraction with volatile solvents and separating the binder from the solvent.

JOHN MARSHALL HOOD.